United States Patent
Okada et al.

(10) Patent No.: US 7,617,086 B2
(45) Date of Patent: Nov. 10, 2009

(54) MONITORING SIMULATING DEVICE, METHOD, AND PROGRAM

(75) Inventors: Toshiro Okada, Kawasaki (JP); Toshiya Yamazaki, Kawasaki (JP); Takao Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/976,623

(22) Filed: Oct. 25, 2007

(65) Prior Publication Data

US 2008/0086295 A1 Apr. 10, 2008

(51) Int. Cl.
G06F 9/44 (2006.01)
G06F 13/10 (2006.01)
G06F 13/12 (2006.01)

(52) U.S. Cl. .............................. 703/21; 703/1; 714/25; 714/737; 709/224

(58) Field of Classification Search .................. 703/21
See application file for complete search history.

(56) References Cited

U.S. PATENT DOCUMENTS

| | | | | |
|---|---|---|---|---|
| 5,001,714 | A * | 3/1991 | Stark et al. | 714/737 |
| 5,351,247 | A * | 9/1994 | Dow et al. | 714/26 |
| 5,862,362 | A * | 1/1999 | Somasegar et al. | 703/21 |
| 5,867,689 | A * | 2/1999 | McLain, Jr. | 703/23 |
| 6,633,782 | B1 * | 10/2003 | Schleiss et al. | 700/26 |
| 7,047,176 | B2 * | 5/2006 | Klevans et al. | 703/21 |
| 7,334,222 | B2 * | 2/2008 | Keller | 717/135 |
| 2003/0187967 | A1 * | 10/2003 | Walsh et al. | 709/223 |

FOREIGN PATENT DOCUMENTS

| | | |
|---|---|---|
| JP | 5-66958 | 3/1993 |
| JP | 6-75807 | 3/1994 |
| JP | 2000-322284 | 11/2000 |
| JP | 2002-139807 | 5/2002 |
| JP | 2002-223293 | 8/2002 |

OTHER PUBLICATIONS

International Preliminary Report on Patentability mailed on Nov. 8, 2007 and issued in corresponding International Patent Application No. PCT/JP2005/007773.
International Search Report (PCT/ISA/210) of International Application PCT/JP2005/007773 (mailed on Aug. 9, 2005).

* cited by examiner

*Primary Examiner*—Paul L Rodriguez
*Assistant Examiner*—Mary C Jacob
(74) *Attorney, Agent, or Firm*—Staas & Halsey LLP

(57) ABSTRACT

A design data storage unit stores design data of constituent elements constituting a computer system to be monitored. A monitoring condition storage unit stores monitoring conditions of abnormal detection of the object to be monitored and error information to be outputted when the object meets particular monitoring conditions. A constituent component simulated failure setting unit causes the constituent elements in the design data to simulate failure one by one. A monitoring condition check unit checks if each monitoring condition is met when one constituent element is set in a failed state by instructing a network examining unit to examine the design data and extracts all the error information relevant to the met monitoring conditions. According to the results, information on the correspondence between the failed constituent elements and all extracted error information is stored in a monitoring simulation result storage unit.

12 Claims, 10 Drawing Sheets

Fig.4

EQUIPMENT TABLE 23

| MANAGEMENT OBJECT ID | NAME | MODEL | IP ADDRESS |
|---|---|---|---|
| 1 | NIC101-FW | NICFW | 10.1.0.1/24 |
| 2 | FireWall | FW1 | |
| 3 | NIC103-FW | NICFW | 192.168.2.1/24 |
| 4 | LAN Cable | CBL1 | |
| 5 | Port 105 | PT1 | |
| 6 | HUB(1) | HUB123 | 192.168.2.5/24 |
| 7 | Port 107 | PT1 | |
| 8 | Port 108 | PT1 | |
| 9 | LAN Cable | CBL1 | |
| 10 | NIC110-WWW | NICSV | 192.168.2.2/24 |
| 11 | WWW Server | SVR1 | |
| 12 | NIC112-WWW | NICSV | 192.168.1.2/24 |
| 13 | LAN Cable | CBL1 | |
| 14 | Port 114 | PT1 | |
| 15 | HUB(2) | HUB123 | 192.168.1.5/24 |
| 16 | Port 116 | PT1 | |
| 17 | Port 117 | PT1 | |
| 18 | LAN Cable | CBL1 | |
| 19 | NIC119-DB | NICSV | 192.168.1.6/24 |
| 20 | DB Server | SVR3 | |
| 21 | LAN Cable | CBL1 | |
| 22 | NIC122-ADMIN | NICSV | 192.168.2.3/24 |
| 23 | ADMIN Server | SVR2 | |
| 24 | NIC124-ADMIN | NICSV | 192.168.1.3/24 |
| 25 | LAN Cable | CBL1 | |
| 26 | apl | apl1 | |
| 27 | db-soft | db-soft | |
| 28 | term | term1 | ANY |

Fig.5

RELATIONSHIP LIST TABLE 24

| No. | PARENT ID | CHILD ID | RELATIONSHIP |
|---|---|---|---|
| 1 | 28 | 1 | CONNECTION |
| 2 | 2 | 1 | CONTAINMENT |
| 3 | 2 | 3 | CONTAINMENT |
| 4 | 3 | 4 | CONNECTION |
| 5 | 5 | 4 | CONNECTION |
| 6 | 6 | 5 | CONTAINMENT |
| 7 | 6 | 7 | CONTAINMENT |
| 8 | 6 | 8 | CONTAINMENT |
| 9 | 8 | 9 | CONNECTION |
| 10 | 10 | 9 | CONNECTION |
| 11 | 11 | 10 | CONTAINMENT |
| 12 | 11 | 12 | CONTAINMENT |
|  |  |  |  |
|  |  |  |  |
|  |  |  |  |
|  |  |  |  |
|  |  |  |  |
| 13 | 11 | 26 | INSTALLATION |
| 14 | 20 | 27 | INSTALLATION |

Fig.6

TASK AND SERVER MATRIX    25

|  | MONITORING TASK | TASK A |
|---|---|---|
| IMPORTANCE DEGREE | LOW | HIGH |
| ADMIN Server | ○ | × |
| WWW Server | × | ○ |
| DB Server | × | ○ |

○ : ASSOCIATED
× : NOT ASSOCIATED

Fig.7

COMMUNICATION MATRIX (APPLICATION)    26

| START POINT \ END POINT | term | WWW Server + apl | DB Server + db-soft |
|---|---|---|---|
| term |  | http |  |
| WWW Server + apl |  |  | sql |
| DB Server + db-soft |  |  |  |

Fig.8

TASK AND SOFTWARE MATRIX    27

|  | MONITORING TASK | TASK A |
|---|---|---|
| apl |  | ○ |
| db-soft |  | ○ |

Fig.9

MONITORING CONDITION TABLE 28

| MANAGEMENT OBJECT ID | MONITORING SERVER | OBJECT TO BE MONITORED | CONDITION | ERROR CODE | ERROR MESSAGE |
|---|---|---|---|---|---|
| 3 | ADMIN Server | NIC103-FW | COMMUNICATION IS IMPOSSIBLE | E3 | NIC 103 PING Error |
| 6 | ADMIN Server | HUB(1) | COMMUNICATION IS IMPOSSIBLE | E6 | HUB(1) PING Error |
| 10 | ADMIN Server | NIC110-WWW | COMMUNICATION IS IMPOSSIBLE | E10 | NIC 110 PING Error |
| 12 | ADMIN Server | NIC112-WWW | COMMUNICATION IS IMPOSSIBLE | E12 | NIC 112 PING Error |
| 15 | ADMIN Server | HUB(2) | COMMUNICATION IS IMPOSSIBLE | E15 | HUB(2) PING Error |
| 19 | ADMIN Server | NIC119-DB | COMMUNICATION IS IMPOSSIBLE | E19 | NIC 119 PING Error |
| 26 | ADMIN Server | apl | AP DETECTS ABNORMALITY IN COMMUNICATION IN DB | E26 | ABNORMALITY IN DB COMMUNICATION MODULE |

Fig.12

MONITORING SIMULATION RESULT TABLE ~29

| MANAGEMENT OBJECT ID | OBJECT TO BE IN ABNORMAL STATE | ERROR CODE | IMPORTANCE DEGREE |
|---|---|---|---|
| 1 | NIC101-FW | None | HIGH |
| 2 | FireWall | E3 | HIGH |
| 3 | NIC103-FW | E3 | HIGH |
| 4 | LAN Cable | E3 | HIGH |
| 5 | Port 105 | E3 | HIGH |
| 6 | HUB(1) | E3,6,10 | HIGH |
| 7 | Port 107 | E3,6,10 | LOW |
| 8 | Port 108 | E10 | HIGH |
| 9 | LAN Cable | E10 | HIGH |
| 10 | NIC110-WWW | E10 | HIGH |
| 11 | WWW Server | E10,12 | HIGH |
| 12 | NIC112-WWW | E12 | HIGH |
| 13 | LAN Cable | E12 | HIGH |
| 14 | Port 114 | E12 | HIGH |
| 15 | HUB(2) | E15,E12,E19 | HIGH |
| 16 | Port 116 | E15,E12,E19 | LOW |
| 17 | Port 117 | E19,E26 | HIGH |
| 18 | LAN Cable | E19,E26 | HIGH |
| 19 | NIC119-DB | E19,E26 | HIGH |
| 20 | DB Server | E19,E26 | HIGH |
| 21 | LAN Cable | E3,E6,E10 | LOW |
| 22 | NIC122-ADMIN | E3,E6,E10 | LOW |
| 23 | ADMIN Server | None | LOW |
| 24 | NIC124-ADMIN | E15,E12,E19 | LOW |
| 25 | LAN Cable | E15,E12,E19 | LOW |
| 26 | apl | E26 | HIGH |
| 27 | db-soft | E26 | HIGH |
| 28 | term | None | HIGH |

MONITORING SIMULATING DEVICE, METHOD, AND PROGRAM

CROSS-REFERENCE TO RELATED APPLICATIONS

This application claims priority of PCT International Application PCT/JP2005/007773 filed on Apr. 25, 2005, the contents of which are incorporated by reference herein.

BACKGROUND OF THE INVENTION

1. Field of the Invention

The present invention relates to a monitoring simulating device, method, and program for performing simulation to acquire the relationship between a failure point and a monitoring error message by using the configuration information of a computer system and creating a complete list of failure points and error messages.

2. Description of the Related Art

It is required in the operation of a computer system, if a failure occurs, to detect a failure point as soon as possible and restore the failure point to normal. To this end, the process is used to incorporate a monitoring device into a network system and monitor the operating state of the system using a monitoring tool.

There are available various monitoring methods which include: a method in which a monitoring device detects a failure by confirming whether it is possible to communicate from a monitoring point with a piece of equipment to be monitored using the PING command and a protocol such as HTTP; a method in which a monitoring device periodically receives a KeepAlive message from a piece of equipment to be monitored then determines that a failure has occurred when the monitoring device does not receive a KeepAlive message even after a lapse of a certain period; and a method in which each piece of equipment checks itself and, when any abnormality is found, notifies a monitoring device of the abnormality using message communication. Since notification and monitoring of error messages are generally performed by IP communication in a network system, failure points and error messages do not always correspond one-to-one to each other.

More specifically, in a computer system composed of a plurality of pieces of equipment, if a failure occurs in any of the pieces of equipment, error messages may be outputted in chain reaction not only from the failed piece of equipment but also from others which communicate with the failed piece of equipment. For this reason, it is very difficult for an operations manager of a computer system to identify a failed piece of equipment only by looking at an error message.

To cope with this, there exists a technique for creating a table of correspondence between a combination of a plurality of errors to occur and a piece of equipment which may be failed, inferring a piece of equipment which may be failed using the table, and outputting the piece of equipment. As examples of such techniques, an image processing system described in Patent Document 1 is known.

In the image processing system described in Patent Document 1, to allow quick identification of the cause of a true one of a plurality of associated errors even when the errors occur, an information table is created in advance in which an error message based on a true error is stored for each of error patterns indicating a combination of a plurality of error states. A generated error pattern is retrieved from the information table, and thereby an error message corresponding to the error pattern is outputted.

(Patent Document 1: Japanese Patent Laid-Open 2002-139807)

However, in conventional techniques, to output information which identifies the cause of a true one of a plurality of associated errors when the errors occur, a designer of a computer system is required to create and prepare the information table as described in Patent Document 1.

In a system in which the number of pieces of equipment which may cause failure and of types of error messages are relatively small, it is not very difficult work for a person to create the above-described information table in advance. However, especially in a networked computer system, the number of pieces of equipment to be monitored by a monitoring device of the system is usually excessively large, and the number of error messages is large as well. That is very complicated work for a designer to associate a failure in a piece of equipment with a combination of error messages to be outputted while referring to a network chart. Also, creating the information table manually may cause problems such as an omission in combinations of error messages and an increase in the possibility of errors in setting information identifying a failure point.

In the technique in Patent Document 1 described above, an operator needs to register an appropriate error message in the information table whenever a new error pattern appears. Therefore, conventional techniques are capable of quickly identifying the cause of a true error for a known error pattern but have difficulty in identifying the cause of a true error for an error pattern unregistered in an information table.

SUMMARY OF THE INVENTION

The present invention aims to solve the problems that a designer of a computer system conventionally manually creates the above-described information table while referring to the network chart of the computer system, and the work of creating the information table is very complicated and the problem that there is a possibility of errors made by humans in setting error messages and provide a technique for automatically creating a complete list of failure points and error messages from the configuration information of a designed computer system.

In order to solve the above-described problems, when simulating monitoring of a computer system which comprises a plurality of constituent elements and includes an object to be monitored, a monitoring simulating device according to the present invention first makes a setting to cause the constituent elements stored in a design data storage unit which stores design data including information on a connection relationship among the constituent elements constituting the computer system to falsely fail one by one, by using the design data storage unit and a monitoring condition storage unit which stores a monitoring condition of abnormality detection of the object to be monitored and error information to be outputted when the abnormality of the object to be monitored meeting the monitoring condition is detected. The monitoring simulating device examines whether each of monitoring conditions stored in the monitoring condition storage unit is met when one of the constituent elements in the computer system is falsely set in a pseudo-failed state on the basis of the design data, and, if any of the monitoring conditions is met, extracts all of error information relevant to the met monitoring condition. In response to the result, the monitoring simulating device stores information on correspondence between the falsely failed constituent element and all the extracted error information in a monitoring simulation result storage unit.

Since a complete list of failure points and pieces of error information for objects to be monitored is created in the monitoring simulating result storage unit, a monitoring device can identify a candidate for the cause of a failure on the basis of a plurality of ones of the pieces of error information by referring to the list at the time of monitoring. It is also possible to improve a monitoring system using a relationship between each failure point and a corresponding one of the pieces of error information.

Further, in the above-described invention, on the basis of the design data, it is determined whether the computer system can perform a task when the one of the constituent elements in the computer system is falsely set in the pseudo-failed state, by using information on a relationship between the constituent element and the task performed by the computer system and information on an importance degree of the task stored in the design data storage unit, and, if it is detected that the computer system cannot perform the task, the information on the importance degree relevant to the task is extracted. The information on the importance degree is stored in the monitoring simulation result storage unit, in addition to the information on the correspondence between the falsely failed constituent element and all the extracted error information.

With this configuration, if an error is detected during monitoring, a monitoring device can determine the urgency of the failure from the importance degree of the failure and notify an operations manager of the failure to take appropriate action. Also, a system designer can acquire information for design improvement to raise the reliability of a computer system.

In the present invention, monitoring simulation is performed by using a combination of the configuration information of a network system and a list of monitoring conditions for a system monitoring tool, information on the relationship between a failure point and a monitoring error message is collected, and creation of a complete list of failure points and error messages is automatically performed. This not only lightens the workload for a designer but also eliminates an error or omission caused by humans in setting error messages. Accordingly, it is possible to precisely identify a failure point from an error message. It is also possible to detect a point which is beyond of monitoring by doing a reverse lookup in a list obtained as the result of simulation and to detect a problem with monitoring such as an error message which can not identify a failure point.

BRIEF DESCRIPTION OF THE DRAWINGS

FIG. 4 is a diagram showing an example of an equipment table;

FIG. 5 is a diagram showing an example of a relationship list table;

FIG. 6 is a diagram showing an example of a task and server matrix;

FIG. 7 is a diagram showing an example of a communication matrix;

FIG. 8 is a diagram showing an example of a task and software matrix;

FIG. 9 is a diagram showing an example of a monitoring condition table;

FIG. 12 is a diagram showing an example of a monitoring simulation result table.

DETAILED DESCRIPTION OF THE PREFERRED EMBODIMENTS

An embodiment of the present invention will be described below using the drawings.

Figure 1:
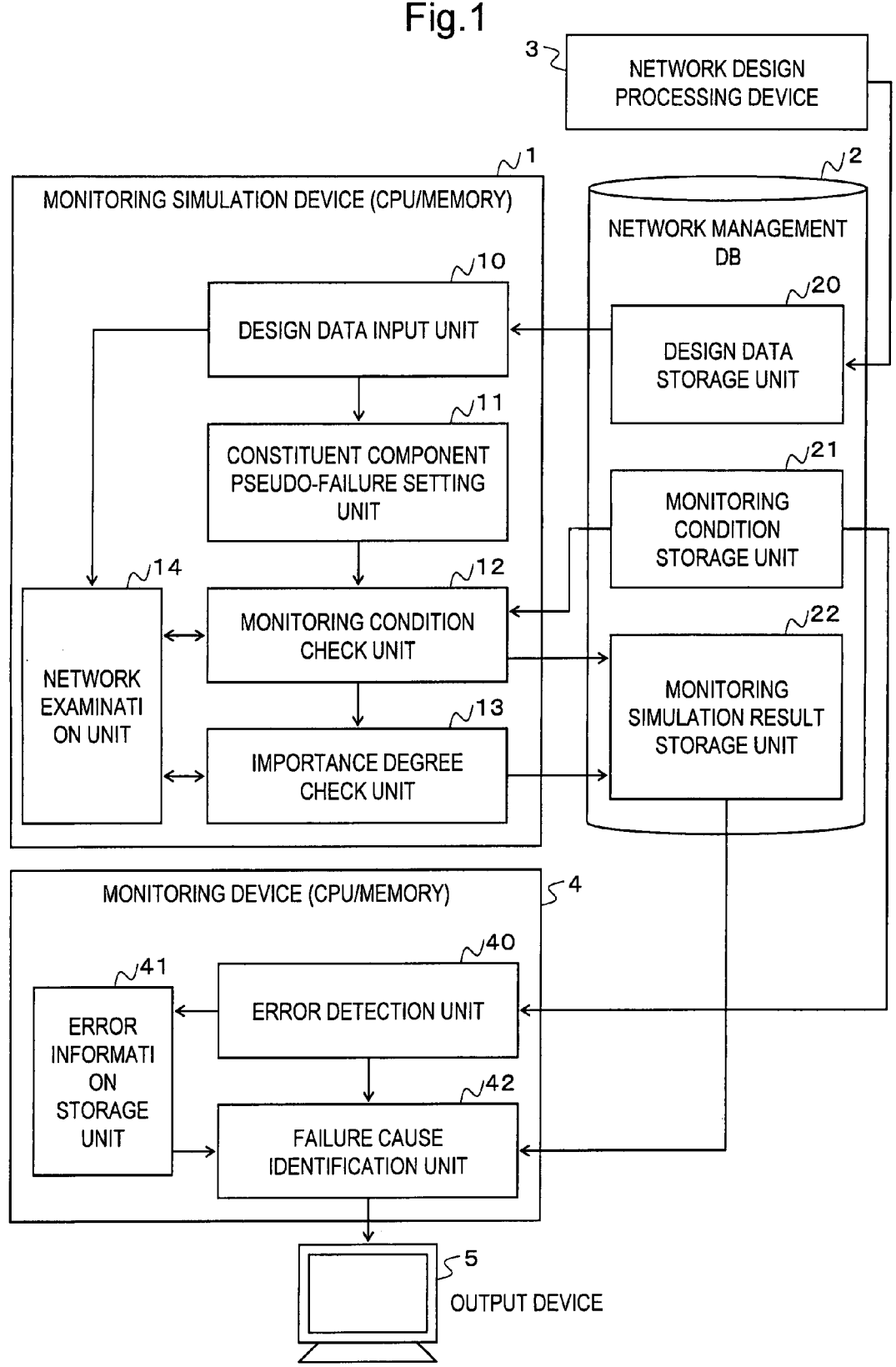
FIG. 1 is a diagram showing an example of a configuration of a monitoring simulation device according to an embodiment of the present invention.

FIG. 1 is a diagram showing an example of the configuration of a monitoring simulation device according to the embodiment of the present invention. A monitoring simulation device 1 includes a design data input unit 10, a constituent component pseudo-failure setting unit 11, a monitoring condition check unit 12, an importance degree check unit 13, and a network examination unit 14. These units are realized by a computer composed of a CPU, memory and the like, and software programs. A network management DB (database) 2 is connected to the monitoring simulation device 1.

The network management DB 2 includes a design data storage unit 20, a monitoring condition storage unit 21, and a monitoring simulation result storage unit 22.

A network design processing device 3 is a computer which designs a network system using CAD and stores the design data of the network system in the design data storage unit 20.

The design data input unit 10 receives the design data inputted from the design data storage unit 20 of the network management DB 2 and creates topology data which indicates pieces of equipment constituting the network system and the connection and containment relationships among them from the inputted design data.

The constituent component pseudo-failure setting unit 11 purposely sets the pieces of equipment constituting the designed network system in the topology data created by the design data input unit 10 in a pseudo-failed state which given purposely one by one. It is not easy to set an actually operated piece of equipment in the pseudo-failed state while it is easy to set the status of a piece of equipment in designed data to the pseudo-failed state.

The monitoring condition check unit 12 receives a monitoring condition inputted from the monitoring condition storage unit 21 of the network management DB 2, requests the network examination unit 14 to examine the topology data, in which a certain one of the pieces of equipment is set in the pseudo-failed state by the constituent component pseudo-failure setting unit 11, and checks whether the inputted monitoring condition is met. The check result is stored in the monitoring simulation result storage unit 22 of the network management DB 2.

The importance degree check unit 13 requests the network examination unit 14 to examine the topology data, in which the piece of equipment is purposely set in the pseudo-failed state by the constituent component pseudo-failure setting unit 11, and checks the effect on tasks performed in the designed network system. The check result is stored in the monitoring simulation result storage unit 22 of the network management DB 2.

The network examination unit 14 performs path examination based on the monitoring condition for the network system at the request of the monitoring condition check unit 12 or importance degree check unit 13, detects a generated error event, and returns the result of the examination.

A monitoring simulation result obtained by the monitoring simulation device 1 is information on the correspondence between information identifying an error which may occur in the network system and a piece of equipment responsible for the error. The error identifying information is an error code or error message which is uniquely assigned to an error. The monitoring simulation result is managed by the network management DB 2 and used to monitor an actual operated network system.

The monitoring device 4 monitors the actual operated network system. The monitoring device 4 includes an error detection unit 40, an error information storage unit 41, and a failure cause identification unit 42. These units are realized by a computer system which is made up of hardware composed of a CPU, memory, and the like and software programs. An output device 5 is connected to the monitoring device 4.

The error detection unit 40 detects a failure in the network system in operation and stores the error information on the failure in the error information storage unit 41.

The failure cause identification unit 42 identifies a piece of equipment which has a cause of the failure using the error information in the error information storage unit 41 and the monitoring simulation result in the monitoring simulation result storage unit 22 of the network management DB 2 and outputs the identified piece of equipment to the output device 5.

This embodiment will be described below more specifically using FIGS. 2 to 12.

Figure 2:
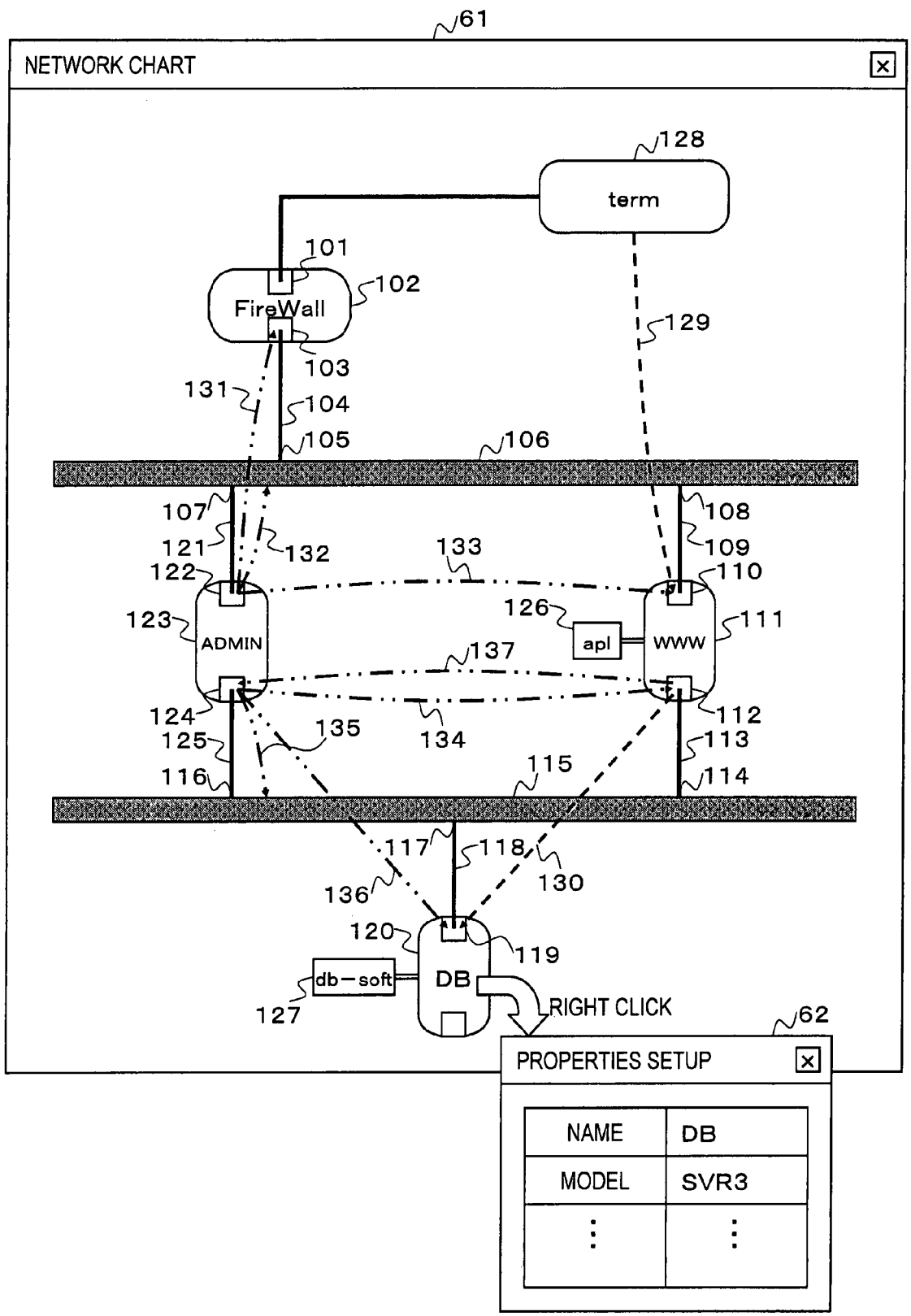
FIG. 2 is a diagram showing an example of a designed network chart.

FIG. 2 is a diagram showing an example of a designed network chart. It is assumed here that a network chart as displayed within a window 61 of the network chart in FIG. 2 is created by the network design processing device 3. In the network chart shown in FIG. 2, a designed network system has a FireWall 102 connected to a term 128 which is an external terminal.

A WWW server 111 and a DB server 120 are each a service-oriented server for providing a service to an external customer. The term 128 can receive a service provided by the designed network system by accessing the WWW server 111.

An ADMIN server 123 is a maintenance-oriented server for performing maintenance and management such as checking of the statuses of pieces of equipment constituting the network system. The ADMIN server 123 has, for example, a function corresponding to the monitoring device 4 shown in FIG. 1.

The FireWall 102, WWW server 111, DB server 120, and ADMIN server 123 are equipped with network interface cards (101, 103, 110, 112, 119, 122, and 124). Note that the network interface cards will be referred to as NICs hereinafter.

The NIC 103, NIC 110, and NIC 122 are respectively connected to a port 105, a port 108, and a port 107 of a HUB(1) 106 through a LAN cable 104, a LAN cable 109, and a LAN cable 121. The NIC 112, NIC 119, and NIC 124 are respectively connected to a port 114, a port 117, and a port 116 of a HUB(2) 115 through a LAN cable 113, a LAN cable 118, and a LAN cable 125.

The WWW server 111 has an "apl" 126 installed thereon which is an application program (hereinafter simply referred to as an application). The DB server 120 has a db-soft 127 installed thereon.

Two types of communication settings, communication settings for service and ones for maintenance are shown in the network chart in FIG. 2. In FIG. 2, each broken line arrow indicates a communication setting for service while each alternate long and two short dashes line arrow indicates a communication setting for maintenance.

As communication settings for service, a communication setting 129 from the term 128 to the NIC 110 of the WWW server 111 and a communication setting 130 from the NIC 112 of the WWW server 111 to the NIC 119 of the DB server 120 are shown in the network chart in FIG. 2.

As communication settings for maintenance, a communication setting 131, a communication setting 132, and a communication setting 133 from the NIC 122 of the ADMIN server 123 to the NIC 103 of the FireWall 102, the HUB 106, and the NIC 110 of the WWW server 111, a communication setting 134, a communication setting 135, and a communication setting 136 from the NIC 124 of the ADMIN server 123 to the NIC 112 of the WWW server 111, the HUB 115, and the NIC 119 of the DB server 120, and a communication setting 137 from the "apl" 126 to the NIC 124 of the ADMIN server 123 via the NIC 112 of the WWW server 111 are shown in the network chart in FIG. 2.

A designer of the network system clicks on one of the pieces of equipment or the communication arrows on the network chart to set properties thereof by clicking a right button on the mouse (this operation is referred t0 "a right click") and opens a properties setup window 62. The designer can set the attributes of the piece of equipment on the property setup window 62. Examples of the attributes include the name, model, IP address, and version number of the piece of equipment and information indicating the connection and containment relationships with the other pieces of equipment. The attribute information for each type of communication include the type of the communication, the IP addresses of start and end points of the communication, and protocol information.

As for the attribute information for the pieces of equipment and types of communication, the attribute information can be defined in advance in the network chart for each of the pieces of equipment and communication components to be used. The attribute information can be held as pieces of component attribute information in an attribute file (not shown) managed by the network design processing device 3. As for attribute items defined in advance in the attribute file, corresponding ones of the pieces of attribute information which are read out from the attribute file are embedded into the property setup window 62 as default values. Accordingly, the designer only needs to input a piece of attribute information specific to each piece of equipment or each type of communication from the property setup window 62. For example, the designer only needs to input minimum necessary pieces of attribute information such as the host name and address information of a server.

Figure 3:
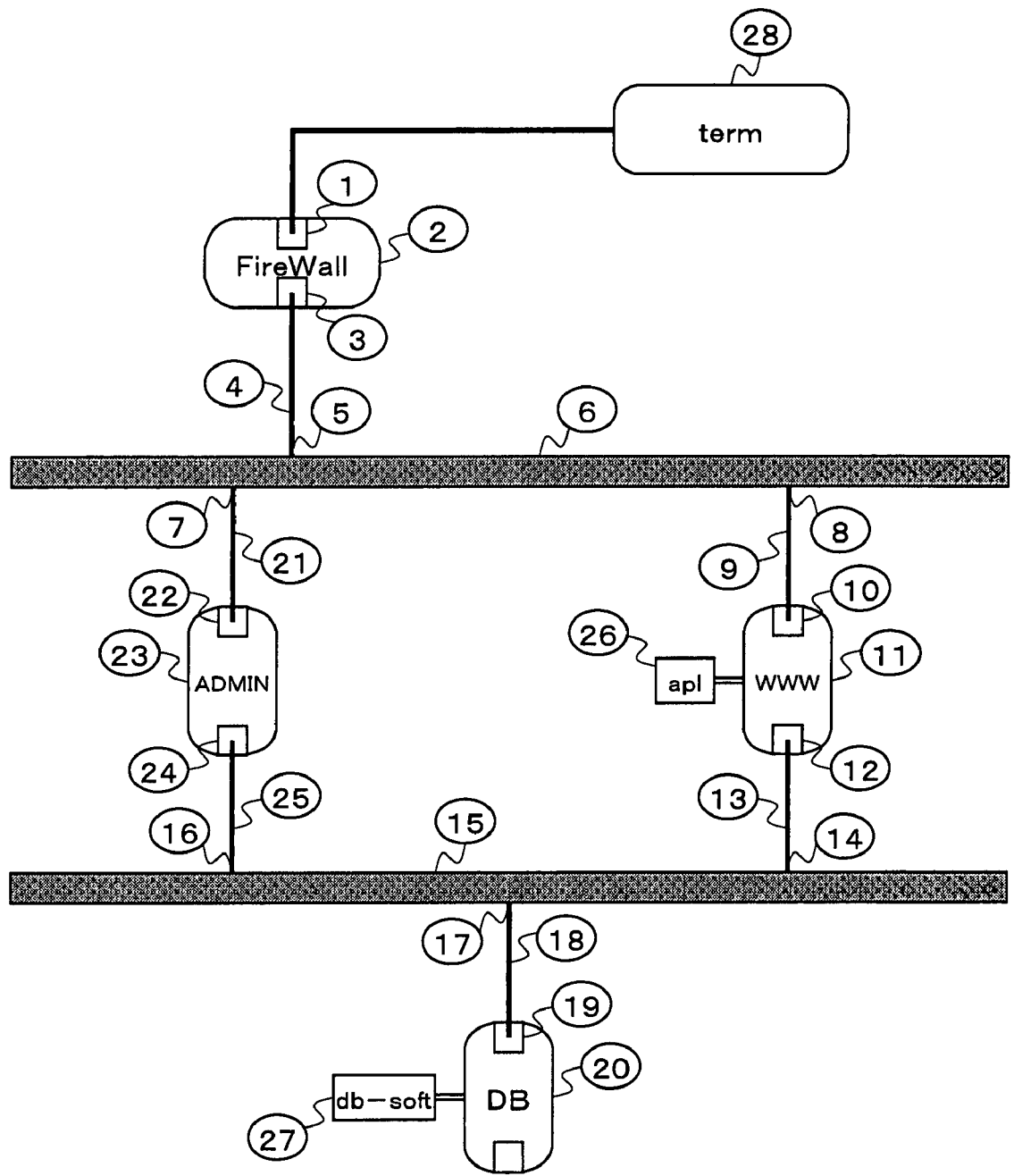
FIG. 3 is a diagram showing examples of management object IDs assigned to components.

FIG. 3 is a diagram showing examples of management object IDs assigned to the respective components. The components constituting the network chart are assigned management object IDs which allow unique identification of the components. In FIG. 3, a number in the ellipse affixed to a component is a management object ID assigned to the component. These management object IDs are identifiers which are automatically assigned by the network design processing device 3 when the components as graphic elements (called objects) are affixed to the network chart.

FIG. 4 is a diagram showing an example of an equipment table. An equipment table 23 shown in the example of FIG. 4 is a table which is created on the basis of the network chart shown in FIG. 2 by the network design processing device 3 and includes network configuration information and is stored in the design data storage unit 20 in the network management DB 2. Each record of the equipment table 23 is composed of items such as a "management object ID" uniquely identifying a piece of equipment, the "name" and "model" of the piece of equipment, and an "IP address" assigned to the piece of equipment.

FIG. 5 is a diagram showing an example of a relationship list table. A relationship list table 24 shown in the example of FIG. 5 is a table of information indicating the relationships among the pieces of equipment which is created on the basis of the network chart shown in FIG. 2 and is stored in the design data storage unit 20 in the network management DB 2. The relationship list table 24 is composed of a parent ID which indicates the management object ID of a piece of equipment serving as a parent, a child ID which indicates the management object ID of a piece of equipment serving as a child, information on the relationship between the pieces of equipment indicated by the parent ID and the child ID, and the like. Examples of the relationship include "connection" which represents that pieces of equipment indicated by a parent ID and child ID are connected, "containment" which represents that a piece of equipment indicated by a child ID is contained in a piece of equipment indicated by a parent ID, and "installation" which represent that software indicated by a child ID is installed on a piece of equipment indicated by a parent ID. These are called a connection relationship and containment relationship.

FIG. 6 is a diagram showing an example of a task and server matrix. A task and server matrix 25 shown in the example of FIG. 6 is information which indicates the association between each task process and the servers and is stored in the design data storage unit 20 in the network management DB 2. In the task and server matrix 25 shown in FIG. 6, a monitoring task is a maintenance-oriented task process, and a task A is a service-oriented task process. The task and server matrix 25 is created on the basis of the pieces of attribute information for the servers inputted at the time of creation of the network chart.

An importance degree is set for each task process. A task process with a high importance degree is a task process which requires prompt restoration in the event of a failure or the like. In contrast, a task process with a low importance degree is a process which does not require an urgent response in the event of a failure or the like. In the example of the task and server matrix 25 shown in FIG. 6, the importance degree of the task A is set to be high while that of the monitoring task is set to be low.

It is apparent from the task and server matrix 25 shown in FIG. 6 that only the ADMIN server 123 is associated with the monitoring task, and the WWW server 111 and DB server 120 are associated with the task A. When a problem occurs in the server(s) associated with each task process, the task process is affected. For example, when a problem occurs in the ADMIN server 123, the monitoring task is affected.

FIG. 7 is a diagram showing an example of a communication matrix. A communication matrix 26 shown in the example of FIG. 7 is information on types of communication set in the network chart and is stored in the design data storage unit 20 in the network management DB 2. The communication matrix 26 is created on the basis of the pieces of attribute information for the communication settings inputted at the time of creation of the network chart.

The communication matrix 26 in the example of FIG. 7 is a service-oriented one centered around the application. Communication between the term 128 and a combination of the WWW server 111 and the "apl" 126 uses http as a protocol and corresponds to the communication setting 129 in the network chart shown in FIG. 2. Communication between a combination of the WWW server 111 and the apl 126 and a combination of the DB server 120 and the db-soft 127 uses "sql" as a protocol and corresponds to the communication setting 130 in the network chart shown in FIG. 2. Note that "sql" is a general term for commands for database search.

Although only an example of the service-oriented communication matrix 26 is shown in FIG. 7, the maintenance-oriented communication matrix 26 for performing maintenance and management of the network system is also present separately. For illustrative simplicity, the maintenance-oriented communication matrix 26 is not shown here.

FIG. 8 is a diagram showing an example of a task and software matrix. A task and software matrix 27 shown in the example of FIG. 8 is information indicating the association between each task process and the pieces of software and is stored in the design data storage unit 20 in the network management DB 2. The task and software matrix 27 is created on the basis of the pieces of attribute information for the pieces of software inputted at the time of creation of the network chart.

It is apparent from the task and software matrix 27 in FIG. 8 that use of the apl 126 and db-soft 127 is set for the task A. As for the monitoring task, nothing has been set.

FIG. 9 is a diagram showing an example of a monitoring condition table. A monitoring condition table 28 shown in the example of FIG. 9 is a table of monitoring conditions for the network system shown in the network chart in FIG. 2 created in advance and is stored in the monitoring condition storage unit 21 in the network management DB 2. Each record of the monitoring condition table 28 is composed of items such as the "management object ID" of a piece of equipment to be monitored, a "monitoring server" which performs monitoring, a "monitoring object" which is the name of the piece of equipment to be monitored, a "condition" under which an error occurs, an "error code" which is assigned when an error occurs, and an "error message." Note that "AP" in the field of condition of the bottom record of the monitoring condition table 28 in FIG. 9 indicates the application.

For example, the top record of the monitoring condition table 28 shown in FIG. 9 represents that if the ADMIN server 123 cannot communicate with the NIC 103 with a management object ID of "3," an error code "E3" and an error message "NIC 103 PING ERROR" are outputted.

The records of the monitoring condition table 28 shown in FIG. 9, in order from the top, correspond to the communication setting 131, communication setting 132, communication setting 133, communication setting 134, communication setting 135, communication setting 136, and communication setting 137, respectively, in the network chart shown in FIG. 2. The communication setting 131, communication setting 132, communication setting 133, communication setting 134, communication setting 135, and communication setting 136 indicate PING monitoring of the respective pieces of equipment by the ADMIN server 123. The communication setting 137 indicates that if the apl 126 detects an abnormality in the communication with the DB server 120, it notifies the ADMIN server 123 of the abnormality in the communication with the DB server 120. The ADMIN server 123 can know an abnormality in a DB communication module by the communication with the apl 126.

It is also possible to create the monitoring condition table 28 from the pieces of attribute information for the maintenance communication settings inputted at the time of creation of the network chart. For example, setting of a "condition," an "error code," an "error message," and the like as the pieces of attribute information for each of the described maintenance communication settings in the properties in the network chart shown in FIG. 2 makes it possible to automatically create the monitoring condition table 28 from the pieces of attribute information.

The monitoring simulation device 1 sets a certain one of the pieces of equipment in the pseudo-failed state in topology data created from design data inputted from the design data storage unit 20 and performs network examination. At this time, the monitoring simulation device 1 extracts one or more error codes which are issued when one of the conditions in the monitoring condition table 28 are met. The extracted one or more error codes are error codes to be generated if the piece of equipment fails in the actual operated network system.

Figure 10:
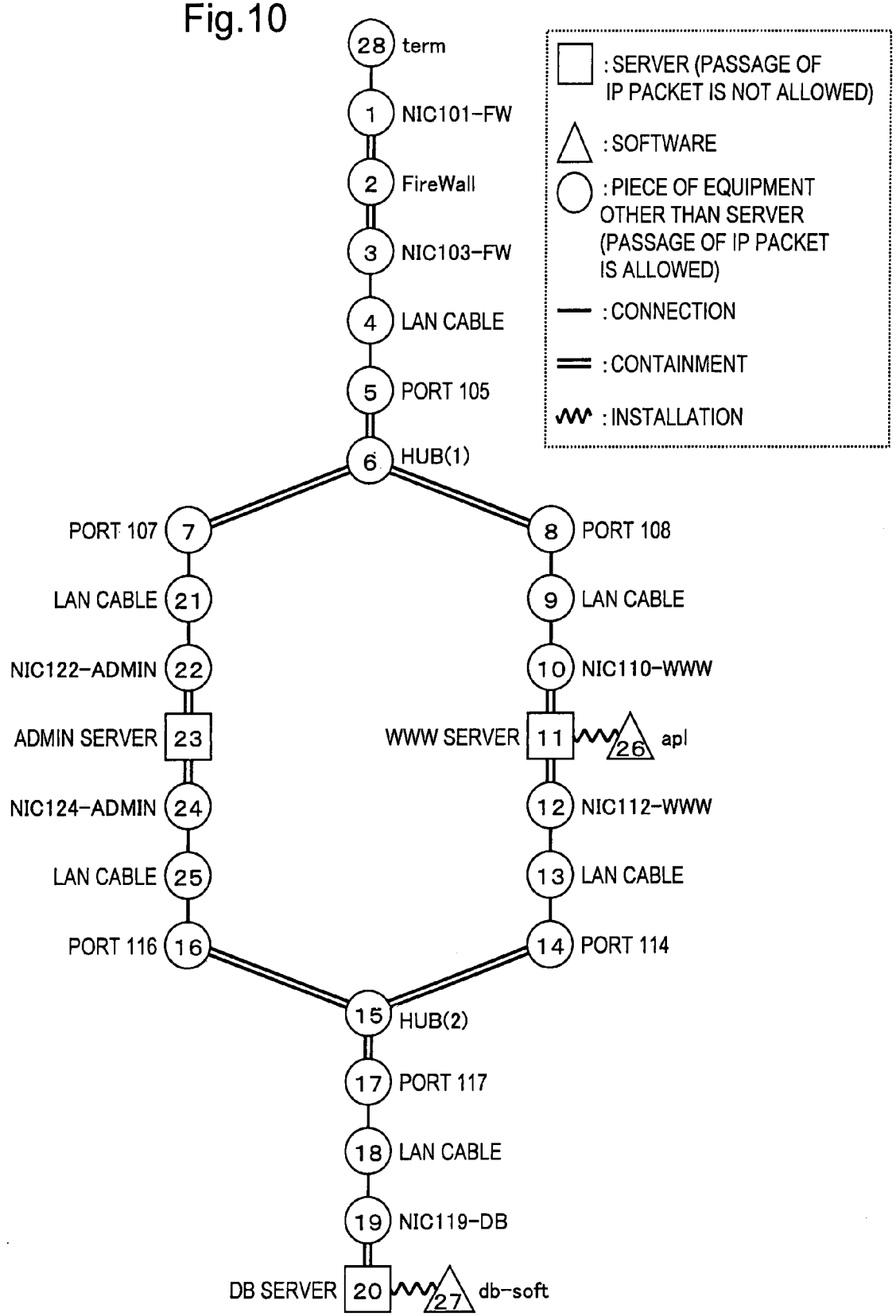
FIG. 10 is a diagram showing topology data created from design data.

FIG. 10 is a diagram showing an example of topology data created from design data. Topology data shown in FIG. 10 is created from the equipment table 23 shown in FIG. 4, the relationship list table 24 shown in FIG. 5, and the like. In the topology data shown in FIG. 10, numbers in squares, triangles, and circles indicating the pieces of equipment correspond to the management object IDs in the equipment table 23 shown in FIG. 4. Note that although the topology data is expressed in graphical form for ease of understanding in FIG. 10, the topology data is held as data composed of information on nodes as the pieces of equipment and pointers which link the nodes in the memory of the monitoring simulation device 1.

The constituent component pseudo-failure setting unit 11 sets the pieces of equipment in the pseudo-failed state one by one in the topology data as shown in FIG. 10, the network examination unit 14 performs examination of the network system, and the monitoring condition check unit 12 checks whether each condition in the monitoring condition table 28 is met. The examination of the network system means, for example, examining whether the types of communication for monitoring given as the monitoring conditions are normally performed by tracing the topology data. A monitoring condition which is met means that an abnormality is detected by network examination, and an error code is determined.

For example, assume that the HUB(1) 106 with a management object ID of "6" is set in the pseudo-failed state in the topology data shown in FIG. 10, and examination of the network system is performed. In this case, since a monitoring device, i.e., the ADMIN server 123 with a management object ID of "23" cannot perform communication via the HUB(1) 106 with the management object ID of "6," error codes "E3," "E6," and "E10" are extracted from the monitoring condition table 28 in FIG. 9.

The constituent component pseudo-failure setting unit 11 sets the pieces of equipment in the pseudo-failed state one by one in the topology data as shown in FIG. 10, the network examination unit 14 performs examination of the network system, and the importance degree check unit 13 checks the effect on each task process.

For example, assume that the HUB(1) 106 with the management object ID of "6" is set in the pseudo-failed state in the topology data shown in FIG. 10, and the examination of the network system is performed. Since the communication matrix 26 shows that communication between the term 128 (management object ID=28) and the application apl 126 of the WWW server 111, i.e., the communication setting 129 for service is impossible, and the task and server matrix 25 shows that the WWW server 111 is associated with the task A, the effect on the task A is detected. Also, the importance degree of "high" is extracted from the task and server matrix 25 shown in FIG. 6.

Figure 11:
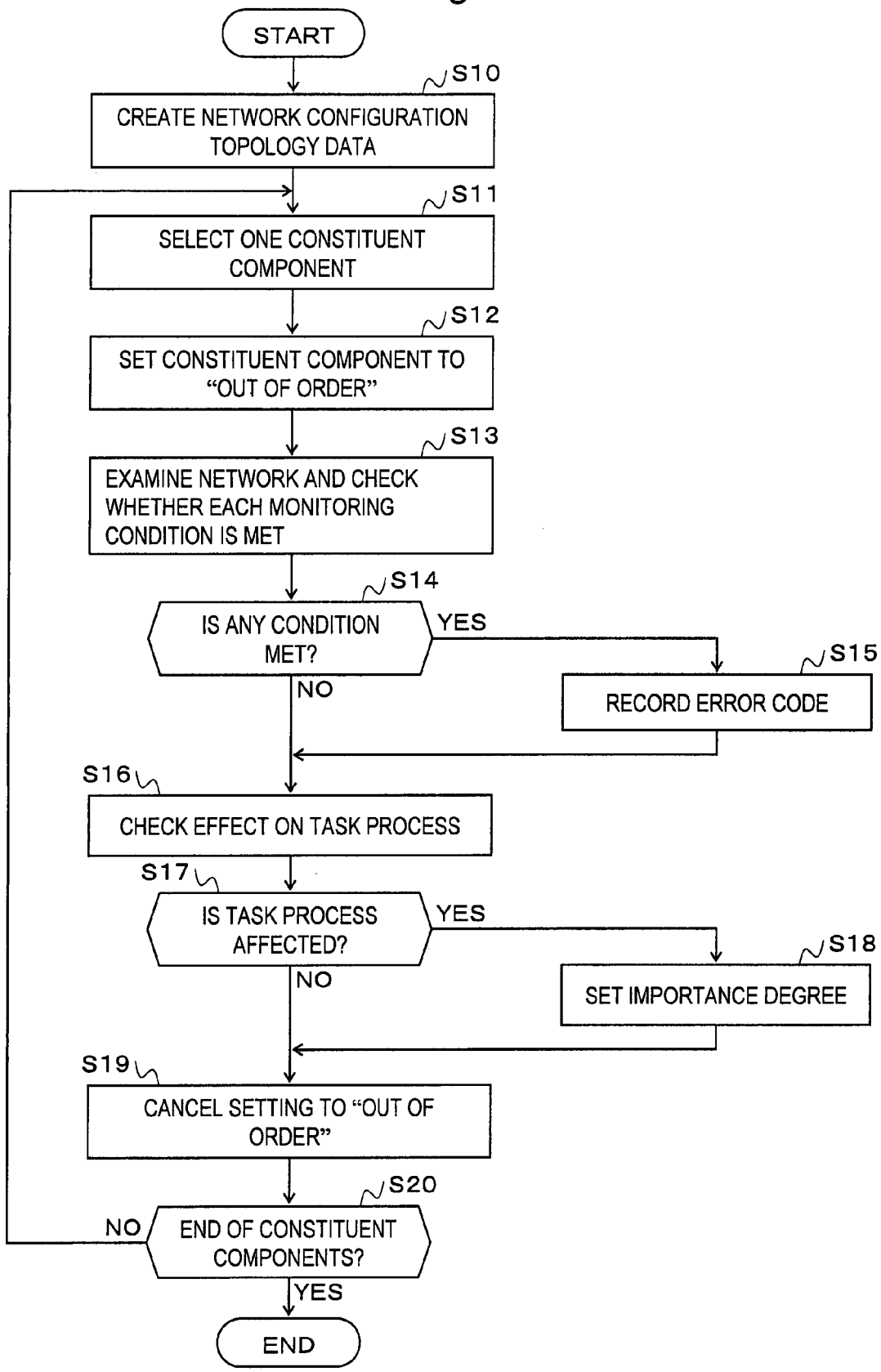
FIG. 11 is a flowchart of a monitoring simulation process according to this embodiment.

FIG. 11 is a flowchart of a monitoring simulation process according to this embodiment. In the monitoring simulation device 1, the design data input unit 10 creates network configuration topology data from design data inputted from the design data storage unit 20 (step S10).

The constituent component pseudo-failure setting unit 11 selects one of constituent components in the topology data (step S11) and sets the selected constituent component to "out of order" (step S12).

The network examination unit 14 examines a network in which the selected constituent component is set to "out of order," and the monitoring condition check unit 12 checks whether each of monitoring conditions inputted from the monitoring condition storage unit 21 is met (step S13). If any of the conditions is met (step S14), the monitoring condition check unit 12 records, in a monitoring simulation result for the selected constituent component, an error code that is generated when the monitoring condition is met (step S15).

The importance degree check unit 13 checks the effect on each task process using the result of the examination by the network examination unit 14 (step S16). If any task process is found to be affected by the out-of-order constituent component when the importance degree check unit 13 refers to the task and server matrix 25 (step S17), the importance degree check unit 13 sets an importance degree in the monitoring simulation result for the selected constituent component (step S18).

The setting of the selected component to "out of order" is canceled (step S19). It is determined whether simulation has been completed for all of the constituent components (step S20). If simulation has not been completed, the processes in steps S11 to S20 are repeated until simulation is completed for all the constituent components.

FIG. 12 is a diagram showing an example of a monitoring simulation result table. A monitoring simulation result table 29 in the example shown in FIG. 12 is information which is acquired by the monitoring simulation process performed by the monitoring simulation device 1 in the network system shown in the network chart in FIG. 2. The monitoring simulation device 1 stores the monitoring simulation result table 29 as shown in FIG. 12 in the monitoring simulation result storage unit 22 of the network management DB 2.

Each record of the monitoring simulation result table 29 in the example shown in FIG. 12 is composed of items such as the "management object ID" of a piece of equipment which is hypothetically set in the pseudo-failed state, an "object in abnormal state" which is the name of the piece of equipment hypothetically set in the pseudo-failed state, an "error code" which is extracted by the monitoring simulation process when the piece of equipment is hypothetically set in the pseudo-failed state, and an "importance degree" which is set by the monitoring simulation process when the piece of equipment hypothetically set in the pseudo-failed state.

An importance degree indicates how much a piece of equipment serving as an object to be in abnormal state affects a task process. For this reason, if a piece of equipment serving as an object to be in abnormal state does not affect any task process, an importance degree need not be set. In the example of the monitoring simulation result table 29 in FIG. 12, an importance degree is set for every piece of equipment. If a network system to be subjected to monitoring simulation has a redundant configuration, the network system has a piece of equipment which does not affect any task process even if it fails.

An example of the operation of the above-described monitoring simulation process will be described. For example, assume that the port 107 with a management object ID of 7 is selected in step S11 of FIG. 11. The constituent component pseudo-failure setting unit 11 sets the port 107 in the pseudo-failed state in the topology data in FIG. 10 (step S12). The monitoring condition check unit 12 requests the network examination unit 14 to perform path examination to see if the type of communication for each monitoring condition set in the monitoring condition table 28 is possible and checks whether the monitoring condition is met (step S13).

Since an object to be monitored with the management object ID of 3 (NIC103-FW) in the monitoring condition table 28 has no communication path from the ADMIN server 123 owing to the out-of-order port 107, the monitoring condition of communication being impossible is met. Accordingly, the monitoring condition check unit 12 records the error code E3 in the field of error code of the port 107 (management object ID=7) in the monitoring simulation result table 29 (step S15). Whether there is a communication path is determined on the basis of whether there is a line connecting nodes at the start and end points of communication in the topology data shown in FIG. 10. Note that when there is an out-of-order piece of equipment between the nodes, the nodes are treated as if they are disconnected from each other. The ADMIN server 123, WWW server 111, and DB server 120 have no function of relaying IP packets. Accordingly, although these servers can each serve as the start point or end point of communication, communication is not performed via the servers.

Similarly, since an object to be monitored with the management object ID of 6 (HUB(1)) in the monitoring condition table 28 has no communication path from the ADMIN server 123 owing to the out-of-order port 107, the monitoring condition of communication being impossible is met. Accordingly, the monitoring condition check unit 12 adds the error code E6 to the field of error code of the port 107 (with the management object ID of 7) in the monitoring simulation result table 29. An object to be monitored with a management object ID of 10 (NIC110-WWW) also has no communication path, and it is found from this that an error with the error code E10 occurs. The monitoring condition check unit 12 adds the error code E10 to the monitoring simulation result table 29.

As a result, the error codes E3, E6, and E10 are stored in the field of error code of the port 107 (management object ID=7) in the monitoring simulation result table 29. This shows that if the port 107 actually fails during operation, messages for the error codes E3, E6, and E10 are outputted.

The importance degree check unit 13 checks the effect on each task process while the port 107 (management object ID=7) is purposely set to "out of order" (step S16). The checking of the effect on each task process is performed by examining, by the network examination unit 14, whether each type of communication in the communication matrix (application) 26 shown in FIG. 7 is possible. As is apparent from the topology data shown in FIG. 10, even if the port 107 fails, communication between the term (management object ID=28) and the application "apl" of the WWW server is possible. The failure also does not interfere with communication between the application "apl" of the WWW server and the software "db-soft" of the DB server. This shows that the task A is not affected by the failure. In contrast, the monitoring task by the ADMIN server is affected by the failure in the port 107. Since the task and server matrix 25 shown in FIG. 6 shows that the importance degree of the failure in the port 107 is "low," the importance degree check unit 13 records "low" in the field of importance degree of the port 107 (management object ID=7) in the monitoring simulation result table 29.

The monitoring simulation device 1 performs pseudo-failed state setting and monitoring condition checking and importance degree checking by network examination as described above for the nodes of the topology data, i.e., the pieces of equipment in the equipment table 23 shown in FIG. 4 one by one. With this operation, it is possible to acquire information of the monitoring simulation result table 29 as shown in FIG. 12.

The monitoring device 4 refers to the monitoring simulation result table 29 stored in the monitoring simulation result storage unit 22 and identifies one of the pieces of equipment which has a cause of the failure by a combination of error codes generated from the actual operated network system. With the monitoring simulation result table 29 as shown in FIG. 12, it is possible to narrow down candidates for the piece of equipment responsible for the failure. It is also possible to know how much the failure affects each task process. Error information stored in the error information storage unit 41 is deleted after the cause of the failure is identified or is periodically outputted as logging data and then deleted.

More specifically, assume that in the actually operated system, the ADMIN server 123 shown in FIG. 2 issues the PING command to each of the management object IDs of 3, 6, and 10 and management object IDs of 12, 15, and 19 according to the monitoring condition table 28 shown in FIG. 9 and monitors responses from them. In this case, for example, when there is no response from the pieces of equipment with the management object IDs of 12, 15, and 19, and PING errors occur, error codes E12, E15, and E19 are obtained as error information. The field of error code of the monitoring simulation result table 29 shows that the piece of equipment, which may have occurred the failure, is highly likely to be one of the HUB(2) (management object ID=15), the port 116 (management object ID=16), the NIC124-ADMIN (management object ID=24), and the LAN cable (management object ID=25).

For this reason, even if a failure occurs in an actual operated network system, since it is easy to identify a piece of equipment having a cause of the failure, prompt restoration of the network system can be expected. Also, since it is possible to know how much a failure point affects a task process, whether a prompt response is necessary can be easily determined.

It is also possible to clarify a blind spot in monitoring of a network system and consider measures such as change of the network system and change of and addition to maintenance communication settings by confirming the contents of the monitoring simulation result table 29 before actual construction of the network system.

For example, it is apparent from the monitoring simulation result table 29 in FIG. 12 that an error in the term 128 cannot be detected. Accordingly, the operations manager of the network system needs to consider measures such as periodical issuance of the PING command from the ADMIN server 123 to the term 128.

For example, if a failure occurs in the NIC 112, the apl 126 becomes unable to communicate with the DB server 120, and E26 is supposed to be generated. However, since the communication setting 137 is set via the NIC 112 in the network chart in FIG. 2, the failure in the NIC 112 prevents the ADMIN server 123 from detecting E26. This shows that the operations manager of the network system needs to consider a communication setting from the apl 126 toward the ADMIN server 123 via the NIC 110.

The processes performed by the monitoring simulation device 1 and those performed by the monitoring device 4 described above can be realized by a computer and a software program. It is possible both to record the program in a computer-readable recording medium and to provide the program over a network.

INDUSTRIAL APPLICABILITY

The present invention is a technique for performing simulation to acquire the relationship between a failure point and a monitoring error message using a combination of the configuration information of a network system and a list of monitoring conditions for a system monitoring tool, automatically performing creation of a complete list of failure points and error messages, and thereby allowing improvement in a monitoring system and identification of a failure point from an error message.

What is claimed is:

1. A monitoring simulation device which simulates monitoring of a computer network system composed of a plurality of constituent elements including an object to be monitored, the monitoring simulation device comprising:
   a design data storage unit for storing design data including information based on connection and structural relationships among the constituent elements constituting the computer network system;
   a monitoring condition storage unit for storing a plurality of monitoring conditions for abnormality detection of an object to be monitored and error information indicating that the abnormality, which has been detected in the object, meets a monitoring condition;
   a design data input unit for creating from the design data, topology data representing relationships among topological elements corresponding to the constituent elements of the computer network system;
   a pseudo-failure setting unit simulating failure in the topological elements by placing the topological elements in pseudo-failure state one by one;
   a monitoring condition check unit for examining all paths from the topological element corresponding to the object constituent element to the topological element in a pseudo-failed state based on the topology data, determining whether each of the monitoring conditions stored in the monitoring condition storage unit are met with the pseudo-failure simulated by the pseudo-failure setting unit and, if any of the monitoring conditions are met, extracting all error information relevant to the met monitoring condition; and
   a monitoring simulation result storage unit for storing information on correspondence between a simulated failed constituent element and all the extracted error information, the information created as a monitoring simulation result in the monitoring condition check unit.

2. The monitoring simulation device according to claim 1, wherein
   the design data storage unit further stores task information based on one or plurality of constituent elements required for each task performed by the computer system and information on an importance degree of the tasks individually,
   the monitoring simulation device includes an importance degree check unit for specifying, on the basis of the topology data, a task that the computer system cannot perform when the topological element corresponding to the constituent elements in the computer system is in the pseudo-failed state and, when it is detected that the computer system cannot perform the task, obtains the importance degree of the specified task, and
   the monitoring simulation result storage unit further stores the information on the task that becomes infeasible based on the pseudo-failure and the importance degree of the task.

3. A monitoring simulation method in which a computer simulates monitoring of a computer network system composed of a plurality of constituent elements including an object to be monitored, the monitoring simulation method comprising:
   inputting design data including information based on connection and structural relationships among the constituent elements constituting the computer network system from a design data storage unit which stores the design data;
   creating, from the design data, topology data representing relationships among topological elements corresponding to the constituent elements of the computer network system;
   simulating failure in the topological elements by placing the topological elements in pseudo-failure state one by one;
   reading out a monitoring condition from a monitoring condition storage unit which stores in advance monitoring conditions of abnormality detection for an object to be monitored and error information indicating that the abnormality, which has been detected in the object, meets the monitoring condition;
   examining, all paths from the topological element corresponding to the object constituent element to the topological element in a pseudo-failed state based on the topology data, determining whether the monitoring condition read out from the monitoring condition storage unit is met with the pseudo-failure simulated and, when the monitoring condition is met, extracting all error information relevant to the met monitoring condition; and
   storing, in a monitoring simulation result storage unit, information on correspondence between a simulated failed constituent element and all the extracted error information, the information created as a monitoring simulation result from the examining.

4. The monitoring simulation method according to claim 3, wherein,
   during the inputting the design data, task information based on one or a plurality of constituent elements required for each task performed by the computer system and information on an importance degree of the tasks individually are further inputted from the design data storage unit, and
   the monitoring simulation method further comprising:
   specifying, on the basis of the topology data, a task that the computer system cannot perform when the topological element corresponding to the constituent elements in the computer system is in the pseudo-failed state and, when it is detected that the computer system cannot perform the task, obtaining the importance degree of the specified task; and
   storing, in the monitoring simulation result storage unit, the information on the task that becomes infeasible based on the pseudo-failure and the importance degree of the task.

5. A computer-readable medium storing a monitoring simulation program, that when executed by a computer, causes the computer to execute a monitoring simulation method of simulating monitoring of a computer network system composed of a plurality of constituent elements including an object to be monitored, the monitoring simulation program causing the computer to execute:

inputting design data including information on connection and structural relationships among the constituent elements constituting the computer network system from a design data storage unit which stores the design data;

creating, from the design data, topology data representing relationships among topological elements corresponding to the constituent elements of the computer network system;

simulating failure in the topological elements in the inputted design data by placing the topological elements in pseudo-failure state one by one;

reading out a monitoring condition from a monitoring condition storage unit which stores monitoring conditions for abnormality detection for an object to be monitored and error information indicating that the abnormality, which has been detected in the object, meets the monitoring condition;

examining all paths from the topological element corresponding to the object constituent element to the topological element in a pseudo-failed state based on the topology data, determining whether the monitoring condition read out from the monitoring condition storage unit is met with the pseudo-failure simulated and, when the monitoring condition is met, extracting all error information relevant to the met monitoring condition; and storing, in a monitoring simulation result storage unit, information on correspondence between the purposely failed constituent element and all the extracted error information, the information created as a monitoring simulation result from the examining.

6. The computer readable medium storing the monitoring simulation program according to claim 5, wherein, during the inputting the design data, task information based on one or a plurality of constituent elements required for each task performed by the computer system and information on an importance degree of the task individually are further inputted from the design data storage unit, and the monitoring simulation program causes the computer to further execute:

specifying, on the basis of the topology data, a task that the computer system cannot perform when the topological element corresponding to the constituent elements in the computer system is in the pseudo-failed state and, when it is detected that the computer system cannot perform the task, obtaining the importance degree of the specified task; and storing, in the monitoring simulation result storage unit, the information on the task that becomes infeasible based on the pseudo-failure and the importance degree of the task.

7. The monitoring simulation device according to claim 1 wherein, the object to be monitored is limited to a constituent element of a computer network system, the topology data represents information on connection, and containment relationships corresponding to the constituent elements of the computer network system.

8. The monitoring simulation method according to claim 3 wherein, the object to be monitored is limited to a constituent element of a computer network system, the topology data represents information on connection, and containment relationships corresponding to the constituent elements of the computer network system.

9. The monitoring simulating program of claim 5 wherein, the object to be monitored is limited to a constituent element of a computer network system, the topology data represents information on connection, and containment relationships corresponding to the constituent elements of the computer network system.

10. The monitoring simulation device according to claim 1, further comprising a failure cause identifying unit which obtains an error notification from the computer network system that is currently operated and identifies a failed constituent element from an obtained error code and the information stored in the monitoring simulation result storage unit.

11. The monitoring simulation method according to claim 3, further comprising a failure cause identifying unit which obtains an error notification from a computer network system that is currently operated and identifies a failed constituent element from an obtained error code and the information stored in the monitoring simulation result storage unit.

12. The monitoring simulation program of claim 5, further comprising:

a failure cause identifying unit which obtains an error notification from a computer network system that is currently operated and identifies a failed constituent element from an obtained error code and the information stored in the monitoring simulation result storage unit.

* * * * *

UNITED STATES PATENT AND TRADEMARK OFFICE
CERTIFICATE OF CORRECTION

| | | |
|---|---|---|
| PATENT NO. | : 7,617,086 B2 | Page 1 of 1 |
| APPLICATION NO. | : 11/976623 | |
| DATED | : November 10, 2009 | |
| INVENTOR(S) | : Toshiro Okada et al. | |

It is certified that error appears in the above-identified patent and that said Letters Patent is hereby corrected as shown below:

On The Title Page, please insert:

Item -- (63) Related U.S. Application Data:
Continuation of Application No. PCT/JP2005/07773, filed April 25, 2005 --

Signed and Sealed this
Seventh Day of June, 2011

David J. Kappos
*Director of the United States Patent and Trademark Office*